(12) United States Patent
Giovanardi

(10) Patent No.: US 8,067,863 B2
(45) Date of Patent: Nov. 29, 2011

(54) DETENT FORCE CORRECTING

(75) Inventor: Marco Giovanardi, Melrose, MA (US)

(73) Assignee: Bose Corporation, Framingham, MA (US)

( * ) Notice: Subject to any disclaimer, the term of this patent is extended or adjusted under 35 U.S.C. 154(b) by 542 days.

(21) Appl. No.: 11/624,370

(22) Filed: Jan. 18, 2007

(65) Prior Publication Data

US 2008/0174185 A1    Jul. 24, 2008

(51) Int. Cl.
*H02K 41/02* (2006.01)
(52) U.S. Cl. ............... 310/12.22; 310/12.24; 310/12.25; 310/12.26
(58) Field of Classification Search ............ 310/12, 310/12.22, 12.24, 12.25, 12.26
See application file for complete search history.

(56) References Cited

U.S. PATENT DOCUMENTS

| | | | | |
|---|---|---|---|---|
| 4,761,574 A * | 8/1988 | Nakagawa | ............... | 310/12.27 |
| 5,214,323 A | 5/1993 | Ueda et al. | | |
| 5,701,039 A | 12/1997 | Parison et al. | | |
| 6,803,682 B1 * | 10/2004 | Thirunarayan et al. | .... | 310/12.24 |
| 6,873,066 B2 * | 3/2005 | Yamamoto et al. | ........ | 310/12.26 |
| 6,919,653 B2 * | 7/2005 | Thirunarayan et al. | .... | 310/12.24 |
| 7,385,678 B2 * | 6/2008 | Dams | ............................ | 355/72 |
| 2002/0145358 A1 * | 10/2002 | Godkin | ......................... | 310/216 |
| 2004/0007921 A1 * | 1/2004 | Harned et al. | .................. | 310/12 |
| 2004/0239194 A1 * | 12/2004 | Thirunarayan et al. | ......... | 310/12 |
| 2006/0006743 A1 * | 1/2006 | Kawai et al. | .................... | 310/12 |
| 2006/0072098 A1 * | 4/2006 | Dams | ............................. | 355/72 |
| 2006/0181158 A1 * | 8/2006 | Tajima et al. | ................... | 310/12 |

FOREIGN PATENT DOCUMENTS

| | | | |
|---|---|---|---|
| CN | 1719702 A | | 1/2006 |
| EP | 0 616 412 | | 9/1994 |
| EP | 1 615 323 | | 1/2006 |
| JP | 08-205514 | | 8/1996 |
| JP | 2000152597 A | * | 5/2000 |
| JP | 2000278931 A | * | 10/2000 |
| JP | 2004289899 A | * | 10/2004 |
| JP | 2004297977 A | * | 10/2004 |
| JP | 2006025476 A | * | 1/2006 |

OTHER PUBLICATIONS

Machine translation of foreign document JP 08205514.*
International Preliminary Report on Patentability dated Apr. 2, 2009 for PCT/US2008051278.
International Search Report and Written Opinion in Application No. PCT/US2008/051278, dated Jun. 9, 2008.
Translation of previously submitted foreign document JP 08205514.
CN Office Action dated Apr. 7, 2011 for CN Appln. No. 200880002368.4.

* cited by examiner

*Primary Examiner* — Quyen Leung
*Assistant Examiner* — Alex W Mok

(57) ABSTRACT

An apparatus comprises a linear electromagnetic actuator which has a series of ferromagnetic poles, coils, and a series of permanent magnets to interact with the poles to induce movement of the actuator along a path. The poles have non-uniform configurations.

4 Claims, 7 Drawing Sheets

DETENT FORCE CORRECTING

BACKGROUND

This disclosure relates to detent force correcting.

In typical linear electromagnetic actuators, for example, the detent force tends to oppose motion of the moving element of the actuator relative to the stationary element of the actuator and is sometimes overcome using energy to apply an opposing force.

One proposed way to compensate for detent force in linear electromagnetic actuators was to add additional, smaller, poles before the first and after the last poles in a series of poles. Another approach included skewing the shapes of the poles to distribute magnetic forces more evenly, as shown in U.S. Pat. No. 5,701,039, which is incorporated here by reference.

SUMMARY

In general, in one aspect, a linear electromagnetic actuator has a series of permeable poles and a series of electromagnets to interact with the permanent magnets to induce movement of the permanent magnets along a path, and the poles have non-uniform configurations.

Implementations may include one or more of the following features. The non-uniform configurations reduce a detent force that occurs along the path. The non-uniform configurations do not substantially affect a force output of the actuator over a range of motion of the actuator. The non-uniform configurations of the poles include different widths of the poles. The widths of the poles vary such that detent forces between the poles and the permanent magnets are of lesser variation than those which would result from uniform widths. Each pole is associated with one of a set of commonly-spaced points along the path, and the non-uniform configurations of the poles include an offset of one of the poles' centers from the commonly-spaced point by an amount that differs from the amount that another pole's center is offset from the commonly-spaced point associated with that pole. The series of poles includes repeating sets of poles, and each pole of each set has the same configuration as a corresponding pole of each other set. Each set of poles includes two symmetric subsets of poles. Each pole is associated with one of a set of commonly-spaced points, the poles each have a first edge and a second edge, and poles in a set of at least some of the poles are positioned such that the first edge of each pole in the set is a different distance from the commonly-spaced point associated with that pole than the first edge of another pole is from the commonly-spaced point associated with that other pole. The second edge of each pole in the set is the same distance as the first edge of that pole from the commonly-spaced point associated with that pole. The second edge of each pole in the set is also a different distance from the commonly-spaced point associated with that pole than the second edge of another pole is from the commonly-spaced point associated with that other pole.

In general, in one aspect, a linear electromagnetic actuator including poles having non-uniform configurations is driven, and a detent force between an armature and a stator of the actuator is reduced so that a force output of the actuator is substantially constant over a range of motion of the actuator.

In general, in one aspect at least some of poles of a linear electromagnetic actuator are configured differently from other poles to reduce a detent force that occurs when an armature of the actuator is moved along a path.

Implementations may include one or more of the following features. The poles are configured to reduce differences in the detent force that occur between different positions of the armature. Configuring the poles differently includes configuring the poles to have different widths.

In general, in one aspect, an active suspension system for a vehicle includes a linear electromagnetic actuator having a series of poles and a series of electromagnets to interact with a series of permanent magnets to induce movement of the permanent magnets along a path, while the poles have non-uniform configurations. A mounting assembly couples the actuator between the body of the vehicle and a wheel assembly.

Advantages include reducing the energy required to overcome passive detent forces in a linear motor and improving the smoothness of the operation of a linear motor.

Other features and advantages will be apparent from the description and from the claims.

DETAILED DESCRIPTION

Figure 1:
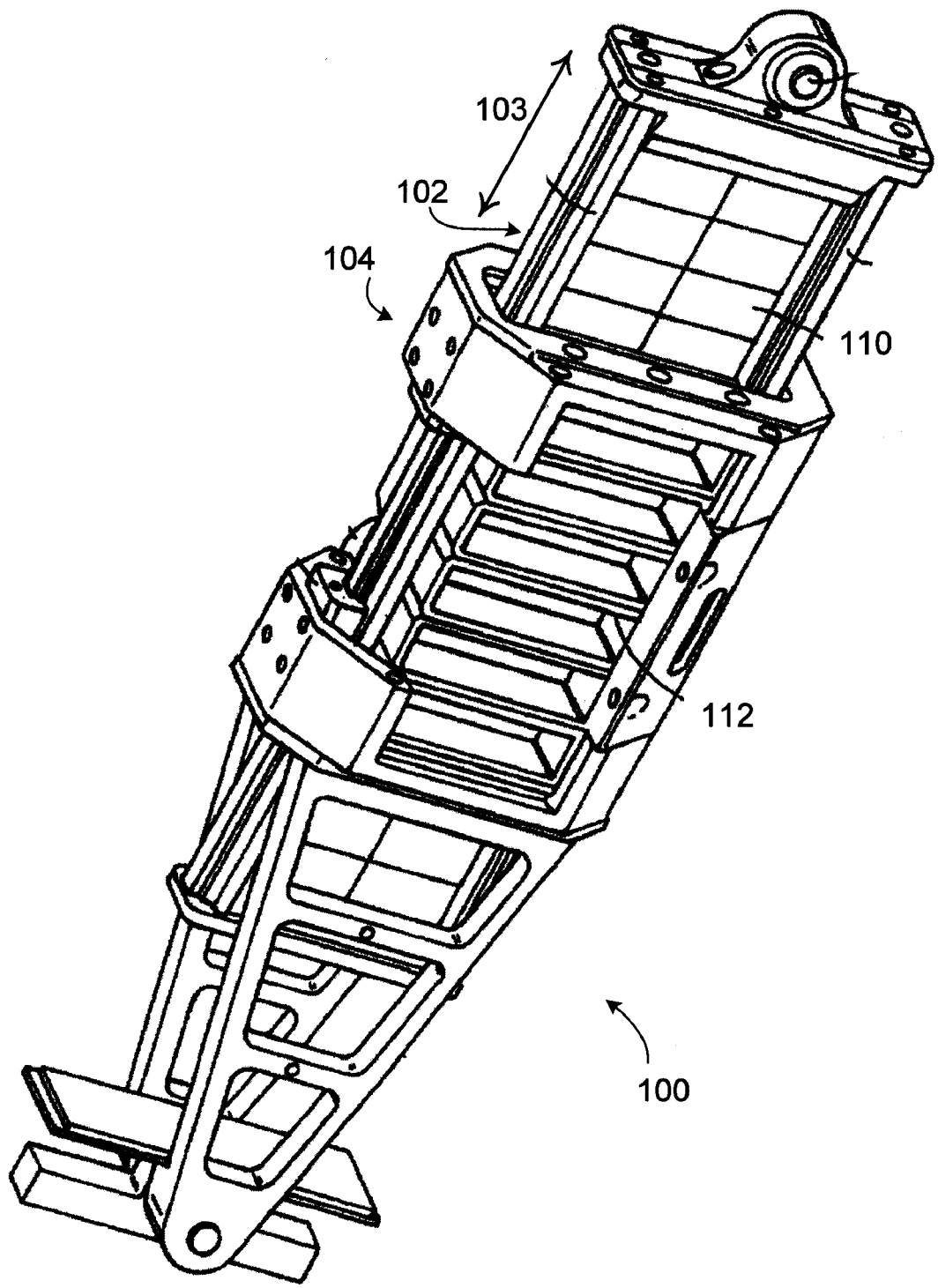
FIG. 1 is a perspective cut-away view of an actuator.

A linear electromagnetic actuator 100, as shown in FIG. 1, can be used in a suspension of a vehicle, for example, between the body of the vehicle and a wheel assembly in place of a shock absorber. The actuator 100 includes an armature 102 that moves back and forth (as indicated by arrows 103) and outer housing 104 (shown with its outer cover removed). In general, linear actuators can be used in any applications where a linear force is useful.

The armature comprises a set of permanent magnets 110. The housing supports a corresponding set of electromagnets including coils 112 which produce magnetic fields when current is passed through them. The magnetic fields produced by the coils 112 interact with the magnetic fields of the permanent magnets 110 to produce a force which moves the armature 102 relative to the housing 104. The electromagnets composed of coils 112 and other electromagnetic components such as poles the coils are wound around (not shown) within the housing 104 make up the stator of the actuator 100.

Figure 2A:
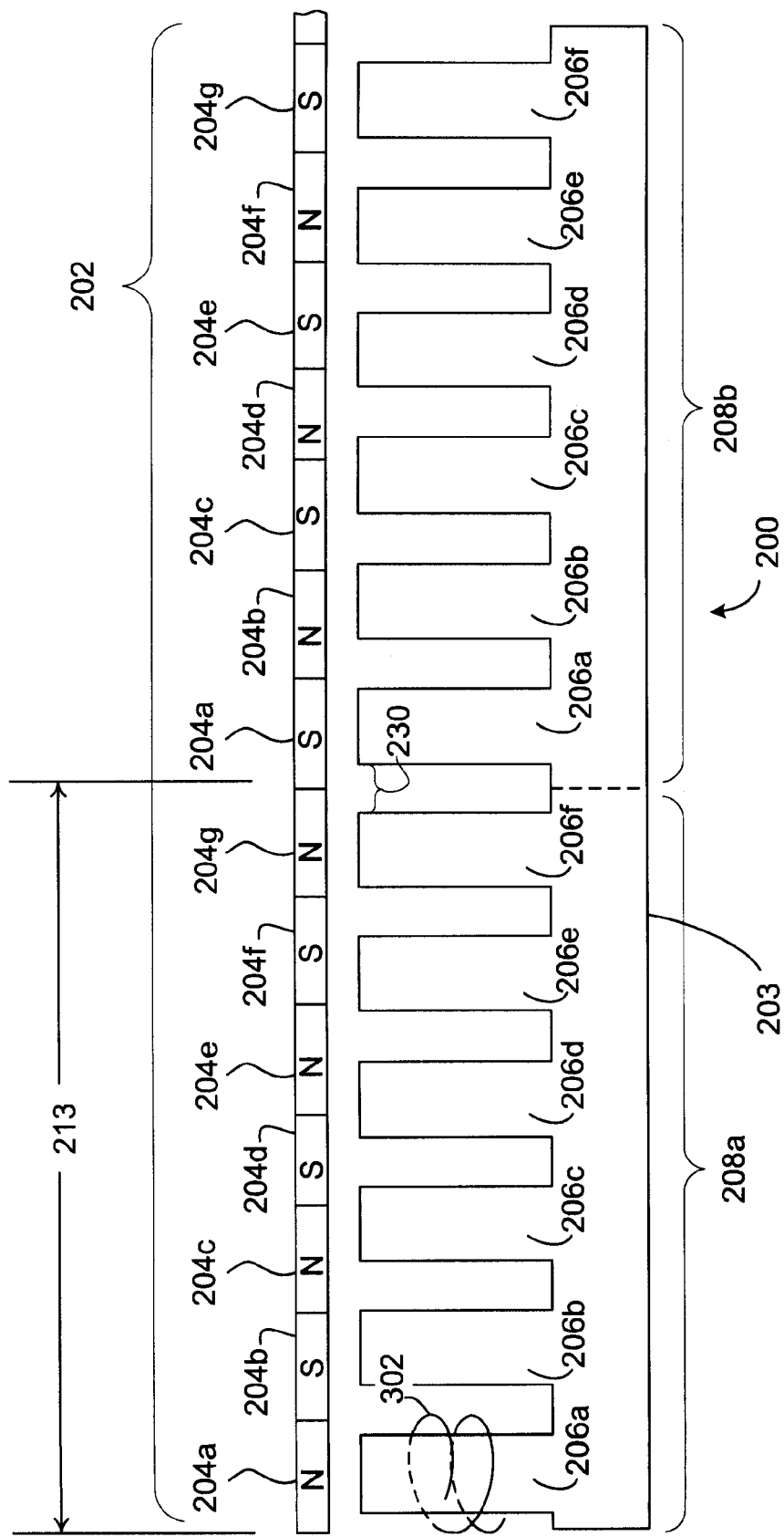
FIGS. 2A and 6 are schematic views of actuators.
Figure 3:
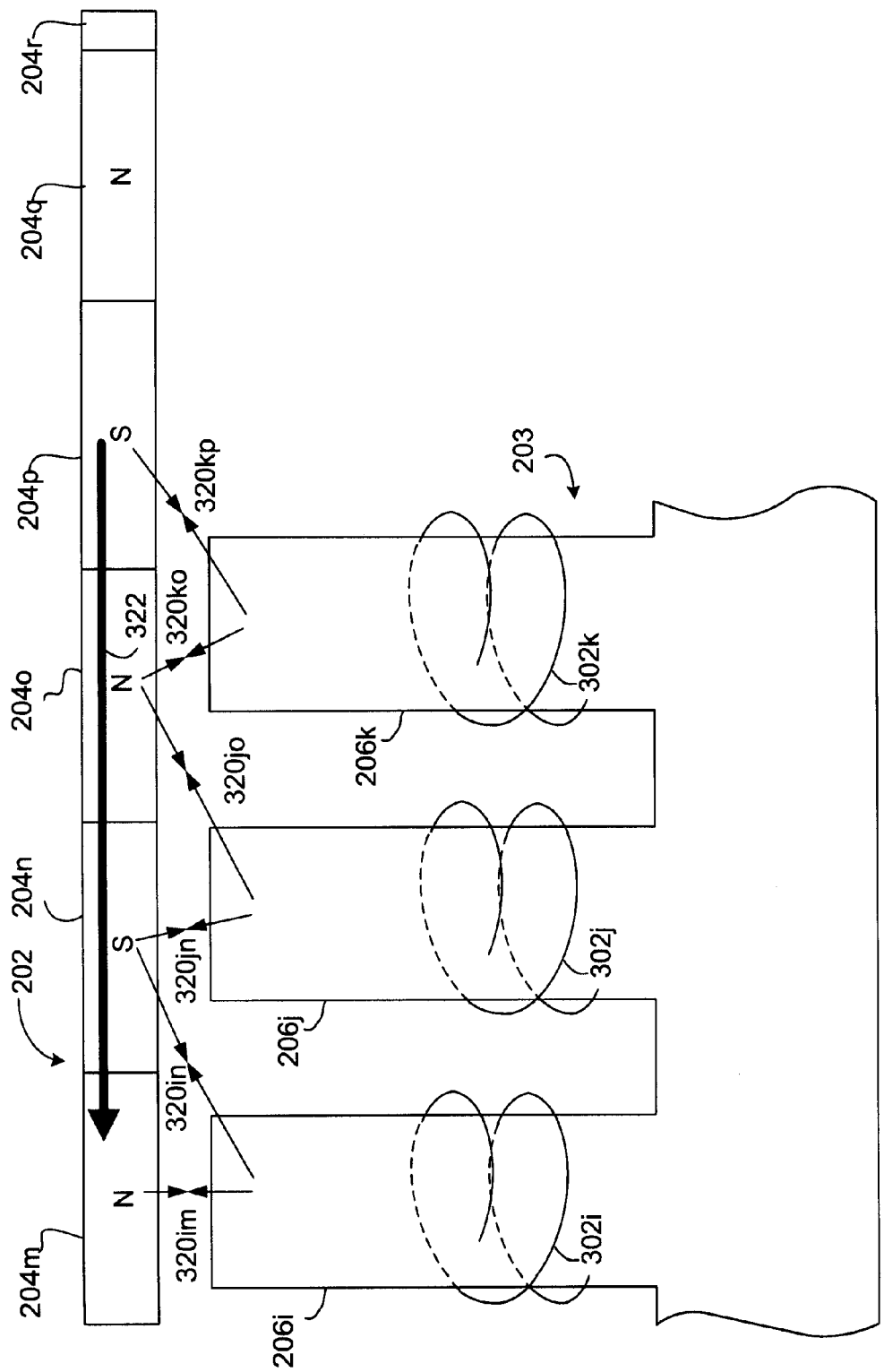

As shown schematically in FIG. 2A, in some examples, a linear electromagnetic actuator 200 has an armature 202 including permanent magnets 204 and a stator 203 including ferromagnetic teeth or poles 206. Coils 302 as well as coils 302*i*, 302*j*, and 302*k* as shown FIG. 3, are wrapped around individual poles to form electromagnets. (In some examples, the permanent magnets are part of the stator and the poles and coils are part of the armature.) It should be noted that what is shown in FIG. 2A is half of a symmetric actuator structure, another mirrored half along a first horizontal symmetric axis of the permanent magnets is not shown (two-sided armature). It also should be noted that although what is shown and described is in light of a symmetric two-sided actuator, the description is also applicable to one-sided actuator structures.

In some examples, the poles are arranged in repeating sets 208*a*, *b* of poles 206*a-f*—symmetric along a second vertical axis. The poles 206 and the permanent magnets 204 are sized and arranged such that different numbers of poles and magnets fit within a given length of the actuator. In the example of FIG. 2A, one set of six poles 206*a-f* align with seven permanent magnets 204*a-g* within a length 213 of the actuator. The same ratio of poles to permanent magnets exists for each of the repeating sets 208*a* and 208*b*.

Figure 2B:
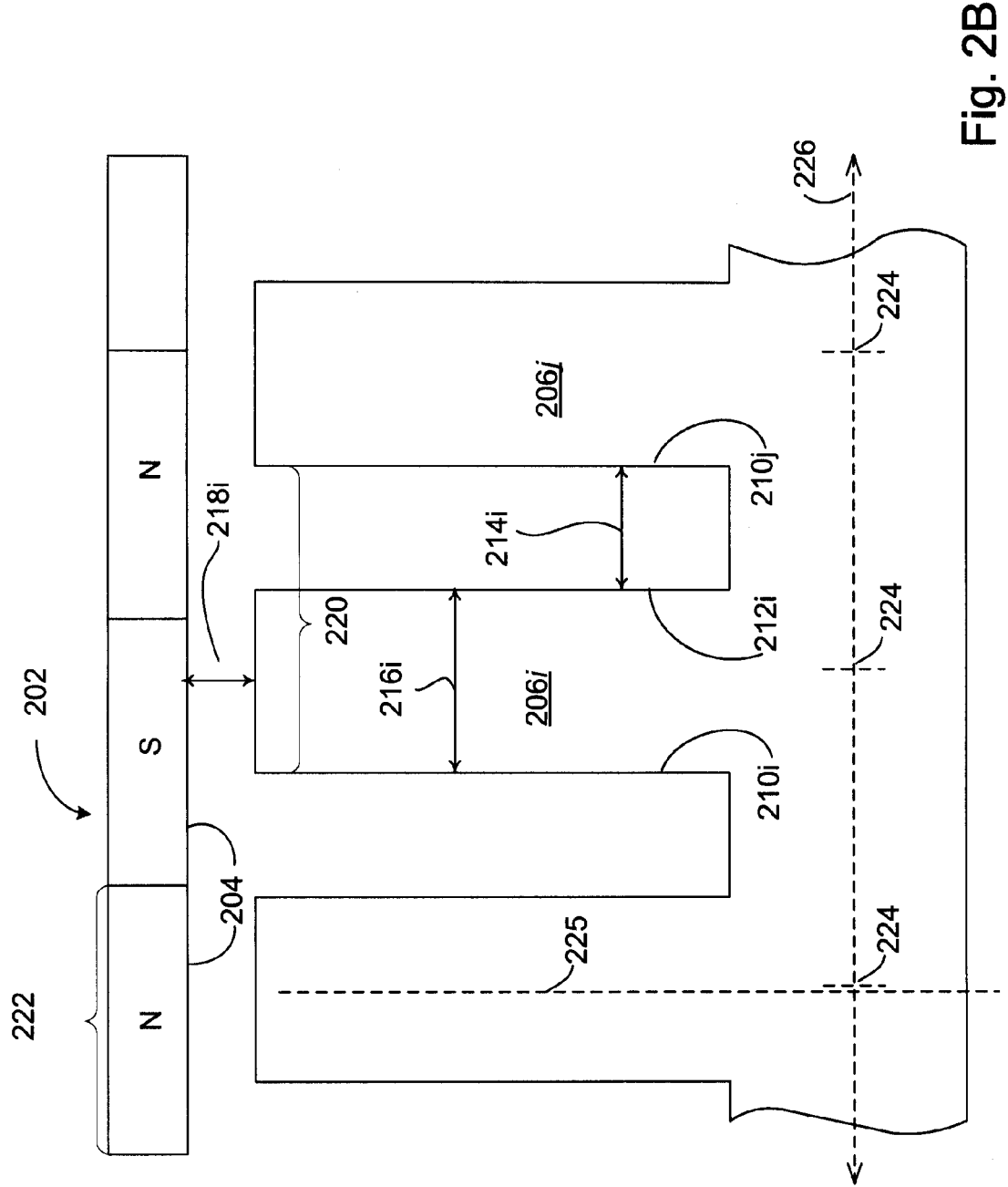
FIGS. 2B and 3 are schematic views of sections of actuators.

In operation, currents are applied to the coils 302 to form electromagnets generating magnetic fields which interact with magnetic fields of the permanent magnets 204. As shown in FIG. 2B, each pole 206*i* has a first edge 210*i* and a second edge 212*i*. Each pole 206*i*, has a width 216*i*, is separated from the next pole by a distance 214*i*, and is a distance 218*i* from the armature 202. The distance 220 from the first edge 210*i* of one pole 206*i* to the first edge 210*j* of the next pole 206*j* is referred to as pole pitch. The distance 222 from one end of one permanent magnet 204 to the same end on the next permanent magnet 204 is the magnet pitch. The poles 206 are associated with respective evenly-spaced center points 224 along an axis 226 that runs along the length of the actuator in the direction of motion. As explained below, the poles 206 are not necessarily centered over the center points 224, that is, the midline 225 of a pole does not necessarily contain one of the center points 224.

The total force exerted on the armature can be divided into two components: one component is the energized force created by electrical currents flowing through the coils; the other component is the passive force created by the interaction of the permanent magnets with the ferromagnetic stator materials. The passive horizontal force, also known as detent force, varies in magnitude and direction. At any given position of the armature with respect to the stator, the armature may thus be pushed or pulled in a certain direction. In a typical configuration, there will be equilibrium points, that is, locations with no detent force present, and the armature will be biased towards those locations.

During operation, as the armature is moved along the stator, certain components of the detent force will variably aid or oppose the desired motion, thus tending to make it less smooth. This is sometimes referred to as cogging, and the detent force as the cogging force.

In the example of FIG. 3, pole 206*i* is near permanent magnet 204*m*, so a strong force 320*im* exists between them. The force 320*in* between pole 206*i* and permanent magnet 204*n*, on the other hand, is much weaker. The forces 320*jn*, *jo*, *ko*, and *kp* between the other poles 206*j*, 206*k* and permanent magnets 204*n*, 204*o*, 204*p* are similarly varied, with current flowing in opposite directions in alternating poles for alternating magnetic polarities, resulting in net detent force 322. If the armature 202 is pushed by some external force toward a position other than an equilibrium point, the detent force will oppose that movement and tend to push or pull the armature back to an equilibrium point. When the actuator is in operation, the detent force is still present, and will interfere with the goal of smooth linear movement of the armature.

What is described herein is a way of reducing the detent force by changing the design of the actuator. In some examples, changes are made to the poles, for example, to their configurations, to decrease and smooth the detent force. By changing the configurations, we mean that the dimensions, spacing, or shape of one or more of the poles can be modified from the nominal, within the normal manufacturing tolerances of the uniformly-sized, evenly-spaced, rectangular configuration shown in FIG. 2B. Different modifications are made to different poles resulting in the poles having non-uniform configurations.

In some examples, the changes are made so that collectively, they reduce the detent force, but they do not change the force output of the actuator. This can be done by assuring that individual changes are small—small changes in each of the poles can result in significant changes to the detent force without significantly increasing or decreasing the force output during active operation.

Figure 4:
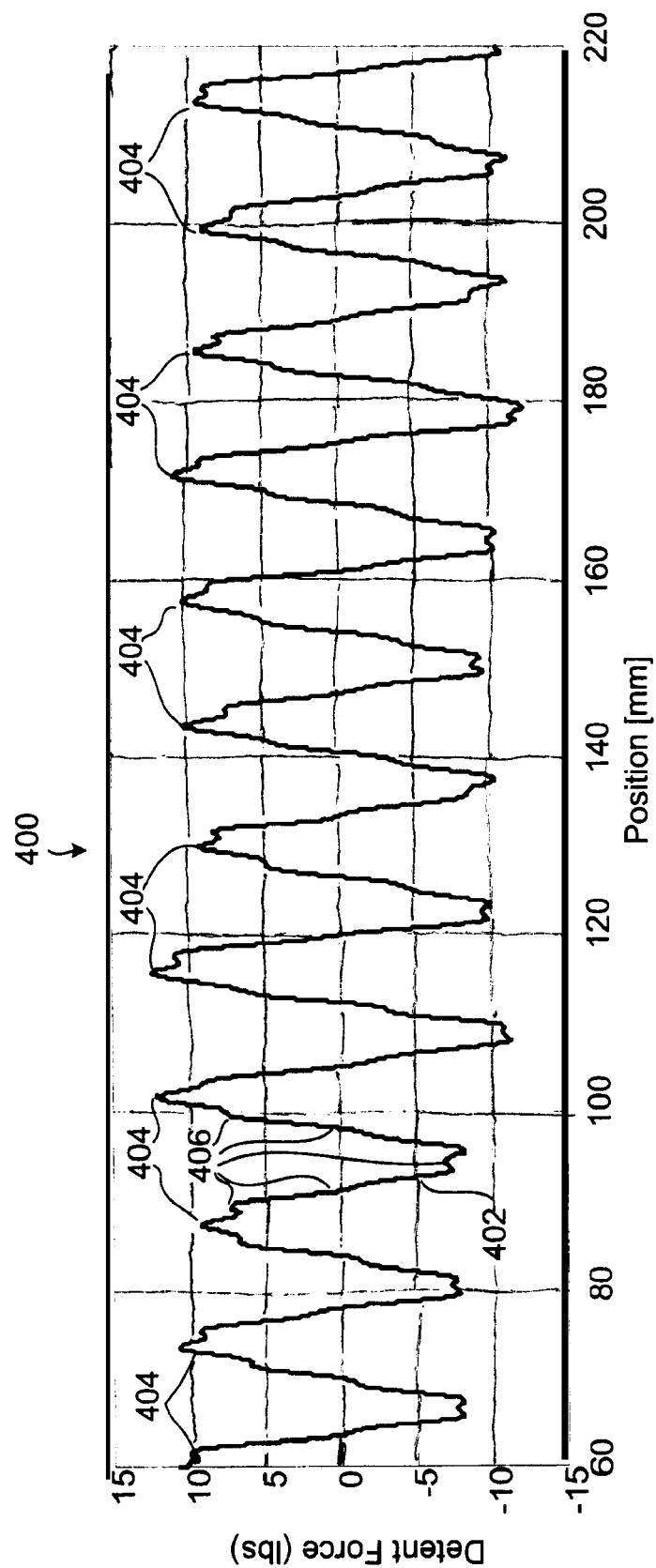
FIGS. 4 and 5 are graphs.

In a linear electromagnetic actuator, the detent force is essentially periodic with the position of the armature, as the arrangement of poles and permanent magnets that results in an equilibrium position tends to repeat. For example, in FIG. 3, if the armature moves the length 222 (FIG. 2B) of one magnet, then the same detent forces will exist between the poles 206*i-k* and the permanent magnets 204*n, o, p,* and *q* that existed in the original position. This periodic force has a fundamental spatial frequency reciprocal to the length 222 of each of the individual permanent magnets. Because the stator is not infinite in length (as is effectively the case in a rotary motor), the forces acting on the last pole at each end are not the same as those in the middle, and the magnitude of the net detent force 322 is not uniform in strength as the armature moves with respect to the actuator, as shown in FIG. 4.

In the example above, where there are six poles for seven permanent magnets, the detent force exhibits a significant sixth harmonic component, at six times the fundamental spatial frequency. A graph 400 shows the measured detent force in one actuator, with a curve 402 showing the detent force as a function of the position of the armature along its potential range of movement along the length of the actuator. In this example, each set of the repeating sets of seven permanent magnets or six poles is 98 mm long (14 mm magnet pitch, 16.3 mm pole pitch). The peaks 404 are spaced apart by the width of the permanent magnets, indicating that they correspond to the fundamental spatial frequency (first harmonic), the reciprocal of magnet pitch 222. Minor peaks 406 occur five times between the major peaks 404, indicating the presence of a strong sixth harmonic component in curve 402 (either of the adjacent peaks 404 comprising the sixth minor peak). In graph 400, non-periodic forces that might affect measurement of the detent force, such as those resulting from eddy currents and friction, have been removed.

Figure 5:
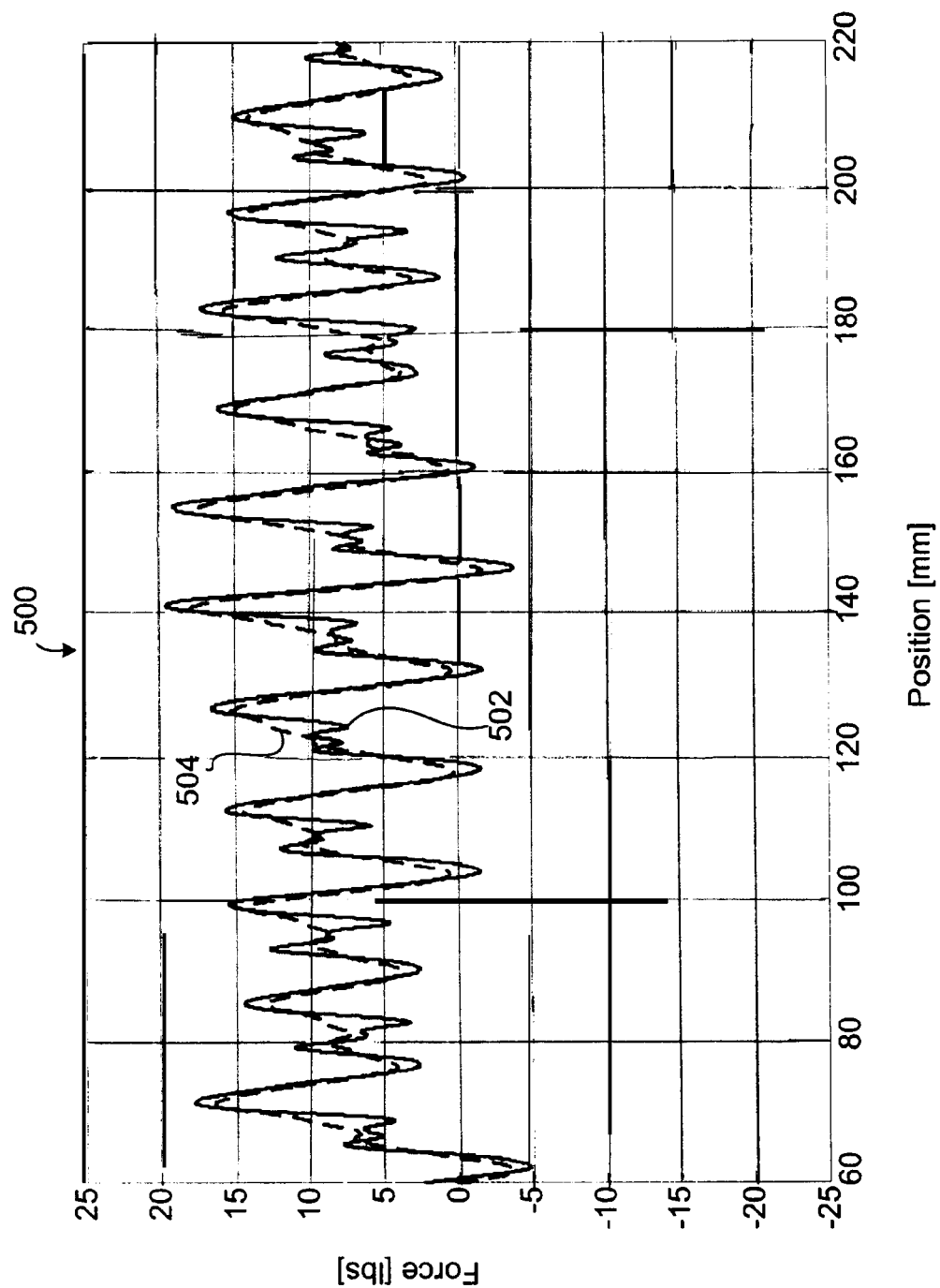

In some examples, increasing the spacing 230 between the two repeating sets 208 (FIG. 2A) of poles produces a reduction in the sixth harmonic component of the detent force. An increased spacing 230 that corresponds to ¹⁄₁₂ th of the magnet pitch puts the 6th harmonic components of the detent forces resulting from the two sets 208 of poles out of phase, thus canceling that component. As shown in FIG. 5, a graph 500 shows the detent force as a function of the position of the armature for actuators with and without a gap between the two sets of poles. Curve 502 (solid line) is the detent force in the actuator without the gap, and curve 504 (dashed line) is the detent force in the actuator with the gap.

In some examples, in addition to or instead of adding a gap between the sets of poles, individual poles can be modified. For example, referring back to FIG. 2B, the width 216 of a pole can be changed, and the center 225 of the pole can be shifted from its nominal center point 224. In some examples, these changes are described in terms of moving individual edges 210, 212 of the poles rather than in terms of their widths 216 and centers 225. Non-uniform configurations of poles include examples in which at least two poles (and possibly more than two or even all of the poles) intentionally have different configurations that are chosen to produce particular effects on the detent force. In some examples, adjacent poles have different (that is, non-uniform) configurations, and there may be patterns of non-uniform configurations among the different poles of the actuator.

Figure 6:
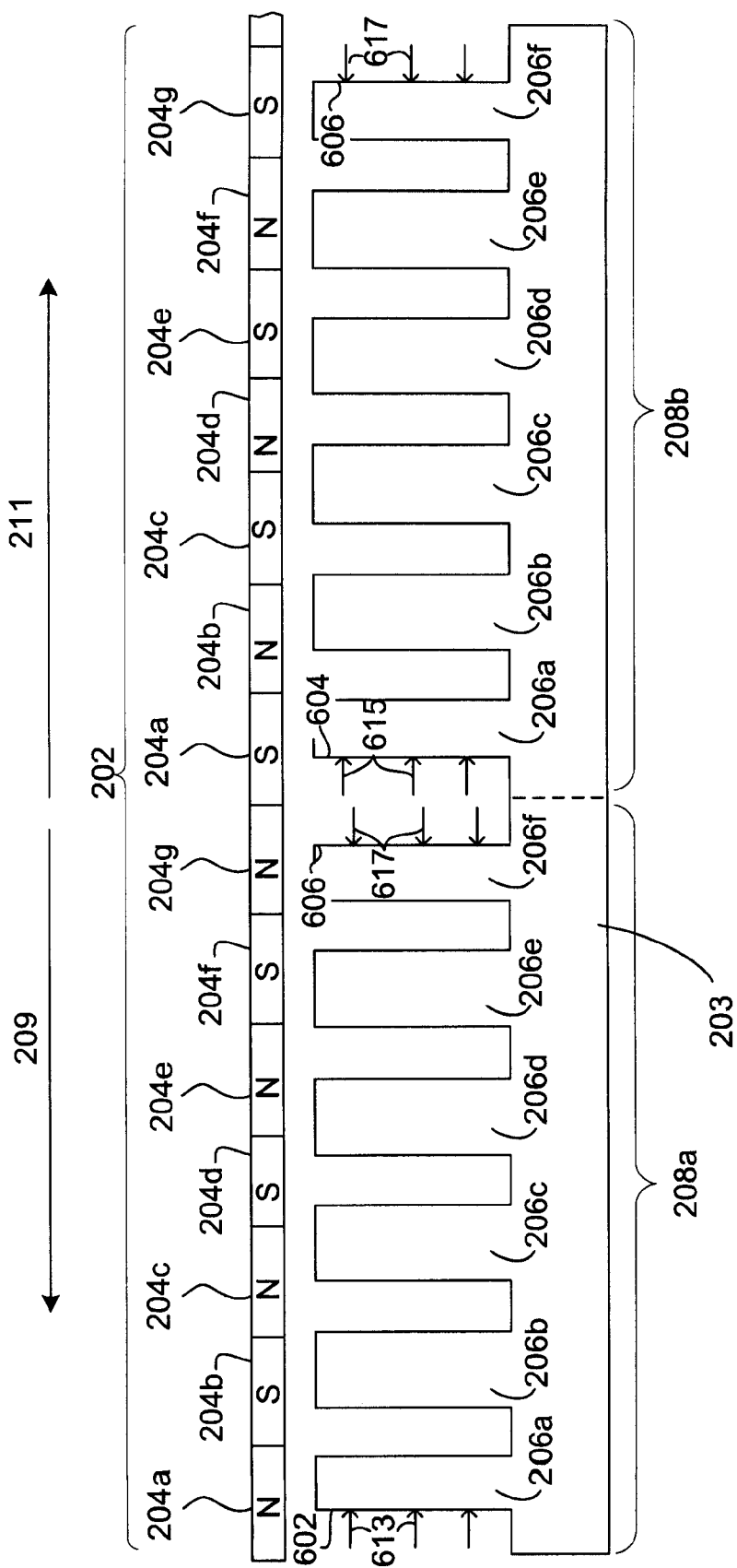

In some examples, the symmetry and periodicity of the sets of poles is used to determine changes to their configurations. For example, the changes that are made to the poles of one set can also be made to corresponding poles in the other set, as shown in FIG. 6. In the example of FIG. 6, the left edge 602 of the first pole 206*a* of the first set 208*a* is shifted by a certain amount (arrows 613), and the left edge 604 of the first pole 206a of the second set 208b is shifted by the same amount and in the same direction (arrows 615).

Each set 208 experiences symmetrical behavior for motions of the actuator 202 in each of the two opposite directions 209, 211 (shown by arrows), because as the permanent magnets 204 approach the first pole 206a from the left (when moving right in FIG. 6), they experience the same magnetic effects as permanent magnets 204 approaching the last pole 206f from the right (when moving left in FIG. 6). For this reason, to reduce the detent force, opposite changes are made to the poles in the second half of each set to the changes made in the first half. For example, if pole 206a in each set 208 has its left edge 602 repositioned towards the center of the pole (arrows 613, 615) by some amount, then pole 206f in each set 208 has its right edge 606 repositioned towards its center (arrows 617) by the same amount.

The result of the periodic and symmetric constraints on changes to the poles is shown in table 1 for a three-phase actuator with six poles in each of two sets. The description is applicable to any number of phase actuators. In table 1, each column represents one potential change, and the rows for that column indicate which poles are changed together, and which edge of each is changed. All the edges indicated in one column are moved the same amount, either toward or away from the center of the pole. For example, column 3 indicates that if the left edge of pole 2 is moved, then the left edge of pole 8 and the right edges of poles 5 and 11 are moved by the same amount. The changes indicated in different columns can be combined to determine changes to all the poles.

TABLE 1

| Pole | Edge to change | | | | | |
| --- | --- | --- | --- | --- | --- | --- |
|  | 1 | 2 | 3 | 4 | 5 | 6 |
| Pole 1 | Left | Right |  |  |  |  |
| Pole 2 |  |  | Left | Right |  |  |
| Pole 3 |  |  |  |  | Left | Right |
| Pole 4 |  |  |  |  | Right | Left |
| Pole 5 |  |  | Right | Left |  |  |
| Pole 6 | Right | Left |  |  |  |  |
| Pole 7 | Left | Right |  |  |  |  |
| Pole 8 |  |  | Left | Right |  |  |
| Pole 9 |  |  |  |  | Left | Right |
| Pole 10 |  |  |  |  | Right | Left |
| Pole 11 |  |  | Right | Left |  |  |
| Pole 12 | Right | Left |  |  |  |  |

In some examples, the end poles 206a and 206f are modified the most, and the center poles 206c and 206d are modified the least, with the intermediate poles 206b and 206e modified an intermediate amount. In some examples, the inner and outer poles are adjusted similarly, and the intermediate poles are adjusted differently. In some examples, the changes exhibit a pattern based on the fundamental frequency of the actuator so that changes to the detent force resulting from the changes to the configuration will have components with the same harmonic frequencies as the original detent force, and be able to cancel them out. If the changes in detent force were at a different frequency than the harmonic components of the detent force, they might decrease it in some locations but increase it in others.

Although the configuration of the poles has been described in terms of "moving" edges or otherwise changing their geometry, in practice these changes may be made as part of the design process, and a set of poles may be manufactured as a single piece with the poles shaped and positioned in the manner described from the outset. This has the advantage of avoiding manufacturing variations that might arise if the poles were modified from a standard shape during production. Because the changes to any single pole are small, manufacturing variations could offset any intended change from the nominal dimensions.

Other embodiments are within the scope of the following claims.

What is claimed is:

1. An apparatus comprising:
  a multiple phase linear electromagnetic actuator with a stator having repeating sets of ferromagnetic pales and corresponding sets of coils, for interacting with an armature having corresponding sets of permanent magnets to induce movement of the armature along a path, wherein;
  each pole is associated with one of a set of evenly spaced center points along an axis that runs along the length of the actuator in the direction of motion, and;
  a plurality of poles of a first set of poles are modified by either one or both of non-uniformly varying the displacement of the centers of the poles with respect to each associated center point and non-uniformly changing the width of the poles, wherein the modifications to the plurality of poles within the first set of poles are made symmetrically with respect to a nominal center of the first set of poles, and wherein:
  the modifications to the poles are small such that they do not substantially change the force output of the actuator.

2. The apparatus of claim 1 wherein:
  changes to a second set of poles are made symmetrically with respect to changes made to the first set of poles with respect to the nominal center of the stator.

3. The apparatus of claim 1 wherein:
  the spacing between the first set of poles and the second set of poles is increased by a small amount.

4. The apparatus of claim 3 wherein:
  the spacing between the first set of poles and the second set of poles is about $1/12$ of the magnet pitch of the armature.

* * * * *